United States Patent
Jiang et al.

[11] Patent Number: 5,946,203
[45] Date of Patent: Aug. 31, 1999

[54] SWITCHING NETWORK AND METHOD OF REDUCING INPUT CURRENT TOTAL HARMONIC DISTORTION ASSOCIATED WITH A BOOST CONVERTER AND A BOOST CONVERTER EMPLOYING THE SWITCHING NETWORK OR METHOD

[75] Inventors: Yimin Jiang; Hengchun Mao, both of Plano, Tex.

[73] Assignee: Lucent Technologies Inc., Murray Hill, N.J.

[21] Appl. No.: 09/118,261

[22] Filed: Jul. 17, 1998

[51] Int. Cl.⁶ .................................................. H02M 1/14
[52] U.S. Cl. ................................................ 363/46; 363/47
[58] Field of Search ................................. 363/39, 42, 44, 363/45, 46, 47

[56] References Cited

U.S. PATENT DOCUMENTS

| | | | |
|---|---|---|---|
| 5,587,892 | 12/1996 | Barrett | 363/44 |
| 5,633,579 | 5/1997 | Kim | 323/222 |
| 5,668,707 | 9/1997 | Barrett | 363/44 |

OTHER PUBLICATIONS

Da Feng Weng, S. Yuvarajan, "Resonant Boost Input Three Phase Power Factor Corrector," 1998 IEEE, pp. 958–962.

*Primary Examiner*—Adolf Denske Berhane

[57] ABSTRACT

For use with a boost converter having first, second and third input inductors, a switching network, method of reducing input current total harmonic distortion (THD) associated with the boost converter, and boost converter employing the switching network and method. In one embodiment, the switching network includes a first switch coupled between corresponding rails of the boost converter. The switching network also includes first, second and third L-C resonant networks wye-coupled to a common node and coupled to the first, second and third input inductors, respectively. The first switch and the first, second and third L-C resonant networks cooperate to create resonant voltages across, and induce phase currents through, the first, second and third input inductors to reduce input current THD associated with the boost converter.

21 Claims, 4 Drawing Sheets

SWITCHING NETWORK AND METHOD OF REDUCING INPUT CURRENT TOTAL HARMONIC DISTORTION ASSOCIATED WITH A BOOST CONVERTER AND A BOOST CONVERTER EMPLOYING THE SWITCHING NETWORK OR METHOD

TECHNICAL FIELD OF THE INVENTION

The present invention is directed, in general, to power conversion and, more specifically, to a switching network and method of reducing input current total harmonic distortion (THD) for a boost converter.

BACKGROUND OF THE INVENTION

Over the past ten years, increasing attention has been focused on input current total harmonic distortion (THD) due to the increasing use of nonlinear loads that tend to degrade AC line quality. THD standards, such as IEC-1000.3.2 promulgated by the International Electrotechnical Commission, address input currents of, for example, 16 amperes or less per phase. Although no international standards for high power rectification exist at the present time, some countries, e.g., India and Brazil, have imposed their own requirements on input current THD to protect their AC line quality.

For producing low THD input currents in three-phase rectification, there are three different conventional approaches. The first approach utilizes six controllable power switches to actively control the three input phase currents. Separate current control loops are used to pattern each of the three input phase current waveforms, resulting in lower THD input currents. This power factor correction (PFC) approach, however, requires complex and relatively expensive control and power conversion circuitry. For example, to implement the current control loops, multiple current sensors are required to detect the input currents. Either digital signal processors (DSPs) or multiple analog controllers are required to process the information. Furthermore, the power stage requires six separate switches with independent drivers, with at least three of the drivers "floating."

The second approach to producing low THD input currents is to employ three single-phase PFC "units" to form a three-phase unit. In single-phase PFC units, input currents are controlled by the duty cycle of a power switch to follow the input voltage emulating a resistive load, which in turn, reduces the THD in the input current. If a single-phase unit has already been developed, a three-phase unit can be readily implemented. A major limitation with this approach is the relatively high cost due to the replication of control and power circuitry required to construct the three-phase unit.

A single-switch boost converter operating in discontinuous conduction mode (DCM) with a high output voltage is the third approach to reducing THD in the input currents. In this boost converter, the decay time of a boost inductor current, over a switching cycle, is determined primarily by the difference between the output DC voltage and the input voltage during the switching cycle. The greater the difference, the faster the inductor currents are reduced to zero. Consequently, the input currents' THDs are also reduced. This approach is attractive for its simplicity, higher reliability and associated lower costs. A serious limitation, however, is that the required output voltage for achieving an acceptable THD value is typically very high. The required high output voltage (for achieving low THD input currents) complicates the selection of the power switching components and the design of the successive, or cascaded load, DC/DC converters, especially when the AC input voltages are as high as 440 volts rms.

Accordingly, what is needed in the art is an improved power converter that overcomes the above-described limitations. More specifically, what is needed in the art is a power converter that has the desirable features of the above-described converters, such as simple control, simple power stage, low output voltage and low input current THD without their limitations.

SUMMARY OF THE INVENTION

To address the above-described deficiencies of the prior art, the present invention provides for use with a boost converter having first, second and third input inductors, a switching network, method of reducing input current total harmonic distortion (THD) associated with the boost converter, and boost converter employing the switching network and method.

In one embodiment, the switching network includes a first switch coupled between corresponding rails of the boost converter. The switching network also includes first, second and third L-C resonant networks wye-coupled to a common node and coupled to the first, second and third input inductors, respectively. The first switch and the first, second and third L-C resonant networks cooperate to create resonant voltages across, and induce phase currents through, the first, second and third input inductors to reduce input current THD associated with the boost converter.

The present invention therefore introduces a switching network for a boost converter that creates resonant voltages across, and induces phase currents through, the first, second and third input inductors to reduce input current THD associated with the boost converter. The operation of the first switch of the switching network facilitates the resonance between the inductors and capacitors of the L-C resonant networks. As a result, resonant voltages are applied across the respective input inductors and, ultimately, the input current THD is reduced in all three phases of the boost converter.

In one embodiment of the present invention, the switching network further includes a second switch coupled to the first switch and first and second intermediate capacitors coupled between the corresponding rails. An intermediate node of the first and second switches is coupled to an intermediate node of the first and second intermediate capacitors.

In one embodiment of the present invention, the boost converter further includes a rectifier interposed between the first, second and third input inductors and the switching network. The rectifier may be a passive or active network. In an alternative embodiment, the boost converter is coupled to a regulation circuit that controls the first switch. The regulation circuit may include a pulse-width modulation (PWM) circuit. Those skilled in the art are familiar with rectifier and regulation circuits.

In one embodiment of the present invention, the boost converter further includes an output capacitor coupled across an output of the boost converter. The output capacitor filters a DC waveform at the converter output. Those skilled in the art are familiar with such filters.

In one embodiment of the present invention, the switching network further includes a plurality of diodes interposed between first, second and third inductors of the first, second and third L-C resonant networks, respectively, and the first switch. In a related, but alternative embodiment, the switching network further includes first and second blocking diodes coupled between the first switch and the corresponding rails. In an embodiment to be illustrated and described, the switching network includes the plurality of diodes and the blocking diodes.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
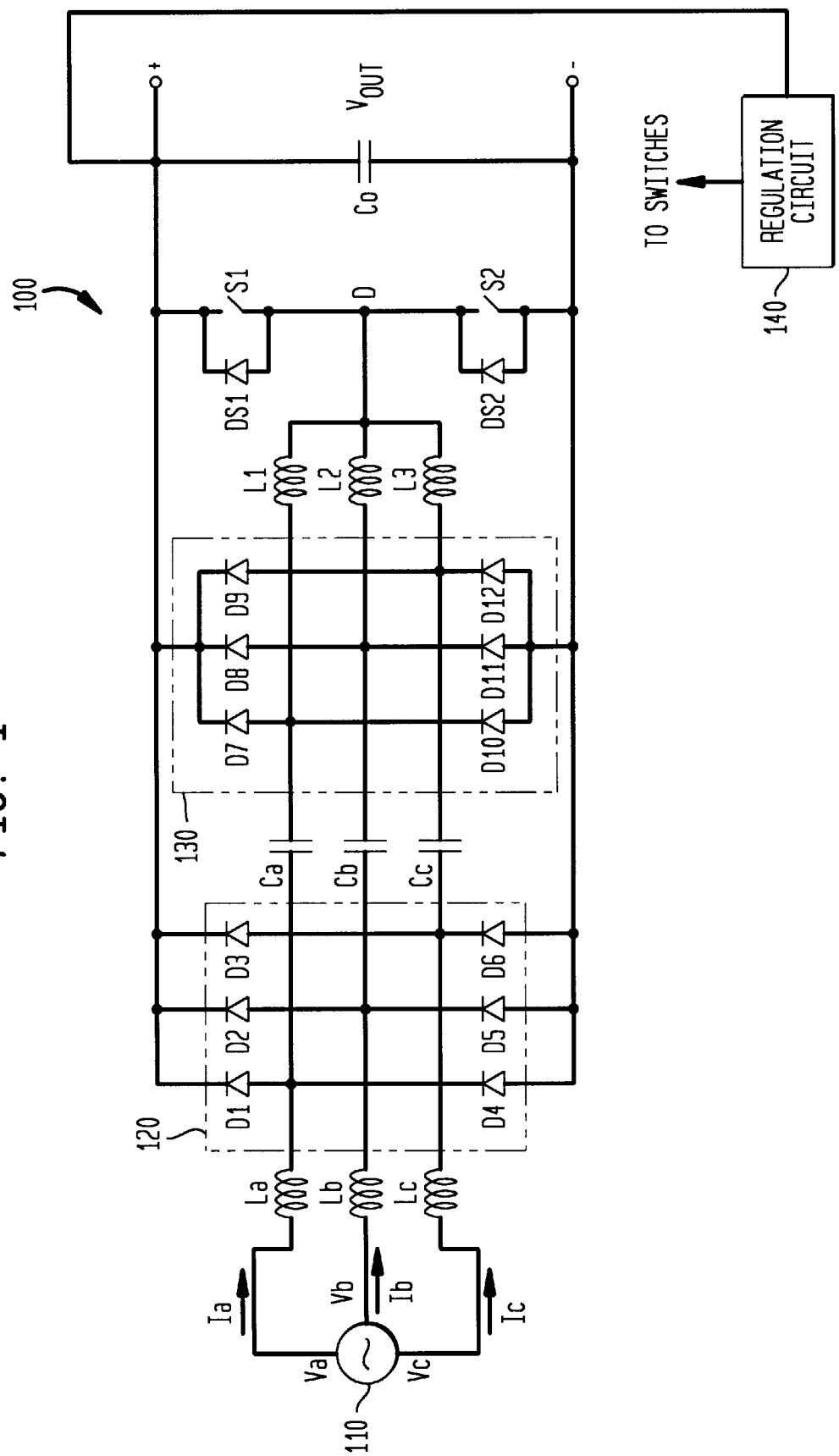
FIG. 1 illustrates a schematic diagram of an exemplary two-switch three-phase boost converter with three L-C resonant branches.

Referring initially to FIG. 1, illustrated is a schematic diagram of an exemplary two-switch three-phase boost converter 100 with three L-C resonant branches. The two-switch three-phase boost converter 100 receives input power from a three-phase AC voltage source 110 through first, second and third boost inductors La, Lb, Lc that are coupled to a three-phase rectifier 120. The three-phase rectifier 120 includes a plurality of diodes D1–D6 arranged in a full bridge configuration.

Also shown coupled to the first, second and third boost inductors La, Lb, Lc are three resonant branches (not separately referenced), each including a resonant capacitor and a resonant inductor. Specifically, the first boost inductor La is coupled to a first resonant capacitor Ca and a first resonant inductor L1, the second boost inductor Lb is coupled to a second resonant capacitor Cb and a second resonant inductor L2, and the third boost inductor Lc is coupled to a third resonant capacitor Cc and a third resonant inductor L3. A freewheeling circuit 130 that includes a plurality of diodes D7–D12 is also coupled to the three resonant branches. A common terminal of the first, second and third resonant inductors L1, L2, L3 is coupled to a node D between the first and second boost switches S1, S2. A regulation circuit 140 senses an output voltage Vout and provides gate drive signals to the first and second boost switches S1, S2. An output capacitor Co is also shown coupled across the first and second boost switches S1, S2 to filter the output DC waveform.

As the operation of the converter 100 over a switching cycle is described in greater detail below, the following assumptions and conditions apply (of course, the assumptions and conditions are not necessary to the operation of the boost converter 100).

(1) The capacitors Ca, Cb and Cc are relatively high frequency capacitors, i.e., the average current through each capacitor over a switching cycle is small enough compared with the high frequency operating current for its voltage to stay in its designed operating region. In other words, the low frequency components of their currents are relatively small.

(2) All the inductors are relatively high frequency inductors, i.e., the average volts-second applied on each inductor over a switching cycle is close to zero. In other words, the inductors do not carry low frequency voltages.

(3) Phase voltage (Va) and phase current (Ia) coupled to the first boost inductor La are greater than 0, or positive; phase voltages (Vb and Vc) and currents (Ib and Ic) coupled to the second and third boost inductors Lb, Lc are negative.

(4) The currents in the first, second and third boost inductors La, Lb, Lc are continuous.

(5) The first and second switches S1, S2 are operated complementarily with duty cycles of about 50%.

It should be noted that the following operational modes are for illustrative purposes and that the operational modes may vary with different operating conditions. Also, for the purposes of the following description and referring to FIG. 1, positive inductor current is defined as moving from left to right and capacitor voltage is defined as positive on its left terminal.

At the end of the second boost switch S2 conduction, i.e., ON, period, the first resonant capacitor Ca is charged by the input current Ia to a positive value while the second and third resonant capacitors Cb, Cc are fully discharged from negative voltages. Also, at this time, the current in the first resonant inductor L1 is positive and is equal to the current in the first boost inductor La. The current in the second resonant inductor L2 is also positive and its amplitude is determined by the resonance between the second resonant capacitor Cb and inductor L2 that occurs when the second boost switch S2 was turned ON. The current in the third resonant inductor L3 is also positive and its amplitude is determined by the resonance between the third resonant capacitor Cc and inductor L3 that occurs when the second boost switch S2 was turned ON. It should be noted that all the resonant inductors carry positive currents at this time.

MODE 1: At the beginning of this first mode, the second boost switch S2 is turned OFF and the first boost switch S1 is turned ON. Once the second boost switch S2 is OFF, the three positive resonant inductor currents force the node D to move to the top rail and the diode Ds1 conducts, allowing the first boost switch S1 to be turned ON at zero voltage. If the switches' duty-cycles are not close to 50%, however, this soft-switching condition may be lost. With the first boost switch S1 ON, the positive voltage on the first resonant capacitor Ca is applied on the first resonant inductor L1 through diode D1, driving the current in the first resonant inductor L1 from a positive value down in a resonant fashion. During this first mode, the second and third resonant inductors L2, L3 first encounter the full output voltage Vout through the first boost switch S1 and the diodes D11, D12. The second and third resonant inductors' L2, L3 currents also decrease from their positive values back to zero. During this mode, the voltages on the second and third resonant capacitors Cb, Cc remain at zero.

MODE 2: In the second mode, the resonance between the first resonant capacitor Ca and inductor L1 continues and the current in the first resonant inductor L1 continues to decrease. The currents in the second and third resonant inductors L2, L3 change to negative and begin to charge the second and third resonant capacitors Cb, Cc to negative voltages. The voltages applied on the second and third resonant inductors L2, L3 are the differences between the output voltage Vout and the voltages on the second and third resonant capacitors Cb, Cc, respectively. The currents in the second and third resonant inductors L2, L3 then increase in the negative direction. This increase is almost linear, because the voltages on the second and third resonant capacitors Cb, Cc remain small compared to the output voltage Vout.

MODE 3: In the third more, once the currents in the second and third resonant inductors L2, L3 "catch up" with the phase currents Ib and Ic, their changing rate is greatly reduced, since they are in series with the substantially larger second and third boost inductors Lb, Lc. Also during this mode, the input phase currents Ib, Ic charge their respective second and third resonant capacitors Cb, Cc to negative voltages. Concurrently, the resonance between the first resonant capacitor Ca and inductor L1 continues with the current in the first resonant inductor L1 becoming negative. The voltage on the first resonant capacitor Ca also decreases with this resonance and may reach zero if the switch ON time is longer than ¼ of the resonant period. If the voltage on the first resonant capacitor Ca reaches zero, the current in the first resonant inductor L1 freewheels through the diode D7 and the voltage on the first resonant capacitor Ca remains at zero, since both the diodes D1, D7 are conducting. At the end of this third mode, all three currents in the first, second and third resonant inductors L1, L2, L3 are negative and conduct through the first boost switch S1. Also, the voltage on the first resonant capacitor Ca is zero if fully discharged. The voltages on the second and third resonant capacitors Cb, Cc are negative, with their amplitudes determined by their corresponding phase currents.

MODE 4: In the fourth mode, the first boost switch S1 turns OFF and the second boost switch S2 turns ON. Once the first boost switch S1 is OFF, the three negative resonant inductor currents force the node D to move to the bottom rail through diode Ds2 and allow the second boost switch S2 to be turned on at zero voltage. The first resonant inductor L1 encounters the full output voltage Vout as its negative current goes through the diodes D7, Ds2. This current decreases in amplitude under the full output voltage Vout and then reverses its direction and the first resonant inductor L1 forms a series circuit with the first resonant capacitor Ca when the diode D7 stops conducting. The first resonant inductor L1 now encounters the output voltage Vout less the voltage on the first resonant capacitor Ca, and its current ramps up. Once it reaches the input phase current Ia, the diode D1 stops conducting and the full input phase current Ia flows into the first resonant capacitor Ca. Additionally, the second and third resonant capacitors Cb, Cc resonate with the second and third resonant inductors L2, L3, respectively. The currents in the second and third resonant inductors L2, L3 also increase from their negative values to positive values. If the second and third resonant capacitors Cb, Cc are fully discharged, the currents in the second and third resonant inductors L2, L3 freewheels through the diodes D11 and D12. This reaches the condition in which the above-described mode 1 is entered.

Figure 2:
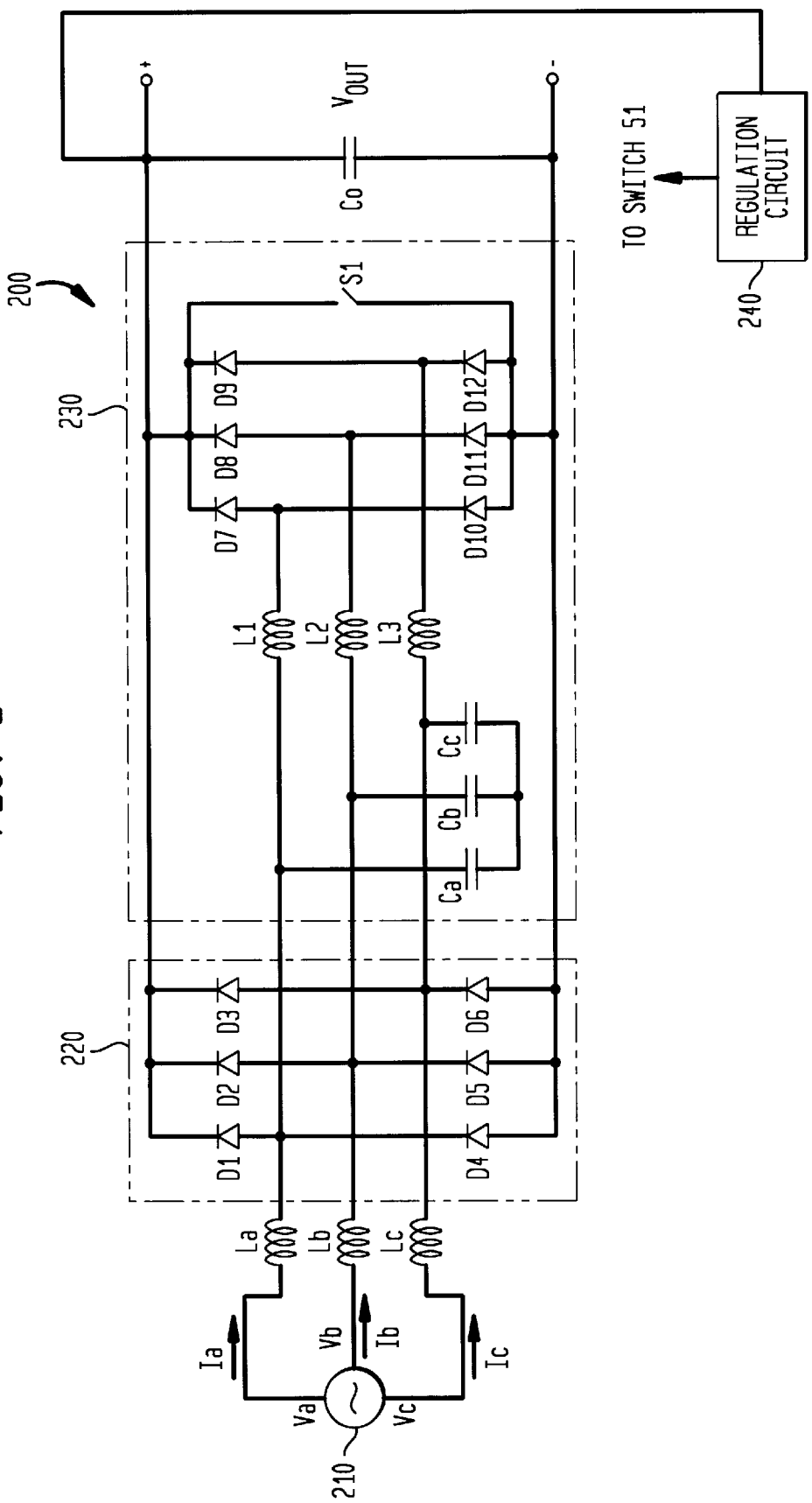
FIG. 2 illustrates a schematic diagram of an embodiment of a single-switch resonant three-phase boost converter constructed according to the principles of the present invention.

Turning now to FIG. 2, illustrated is a schematic diagram of an embodiment of a single-switch resonant three-phase boost converter 200 constructed according to the principles of the present invention. The converter 200 includes first, second and third boost inductors La, Lb, Lc that are coupled to an AC input power source 210. A rectifier 220 that includes a plurality of diodes D1–D6 arranged in a full bridge configuration is also coupled to the boost inductors. Those skilled in the art should readily appreciate that, in other advantageous embodiments, controllable switches may be used in place of the diodes in the rectifier 220. The rectifier 220 provides partial paths for the three input phase currents to flow to the output. A boost switch S1 is also shown in the illustrated embodiment and, in an advantageous embodiment, is a metal oxide semiconductor field-effect transistor (MOSFET). In another advantageous embodiment, other switching devices, such as insulated gate bipolar transistor (IGBT), may also be advantageously employed. The boost switch S1, in an advantageous embodiment, is operated with a duty cycle of about 50%. It should be noted that the duty cycle of the boost switch S1 may be varied and used to control the input power level. In another advantageous embodiment, the switching frequency of the boost switch S1 may be used to control the input power.

The first, second and third boost inductors La, Lb, Lc are also shown coupled to a switching network 230 that includes first, second and third resonant inductors L1, L2, L3 coupled to a second plurality of diodes D7–D14, which include first and second blocking diodes D13, D14, and the boost switch S1. The diodes D7–D14 together with boost switch S1 provide a path for resonant currents to flow. The switching network 230 also includes wye (Y) connected first, second and third resonant capacitors Ca, Cb, Cc. The switching network 230 allows the voltages applied across the first, second and third resonant capacitors Ca, Cb, Cc to discharge, and possible even reverse, every switching cycle when the boost switch S1 is turned ON.

A regulation circuit 240 senses an output voltage Vout and provides gate drive signal to the boost switch S1. In an advantageous embodiment, the regulation circuit includes a PWM controller. Those skilled in the art are familiar with the construction and operation of PWM controllers; thus, they will not hereinafter be described in detail. An output capacitor Co is also shown coupled across the rectifier 220 to filter the output DC waveform. The operation of the converter 200 is best described by referring to FIG. 3, with continuing reference to FIG. 2.

Figure 3:
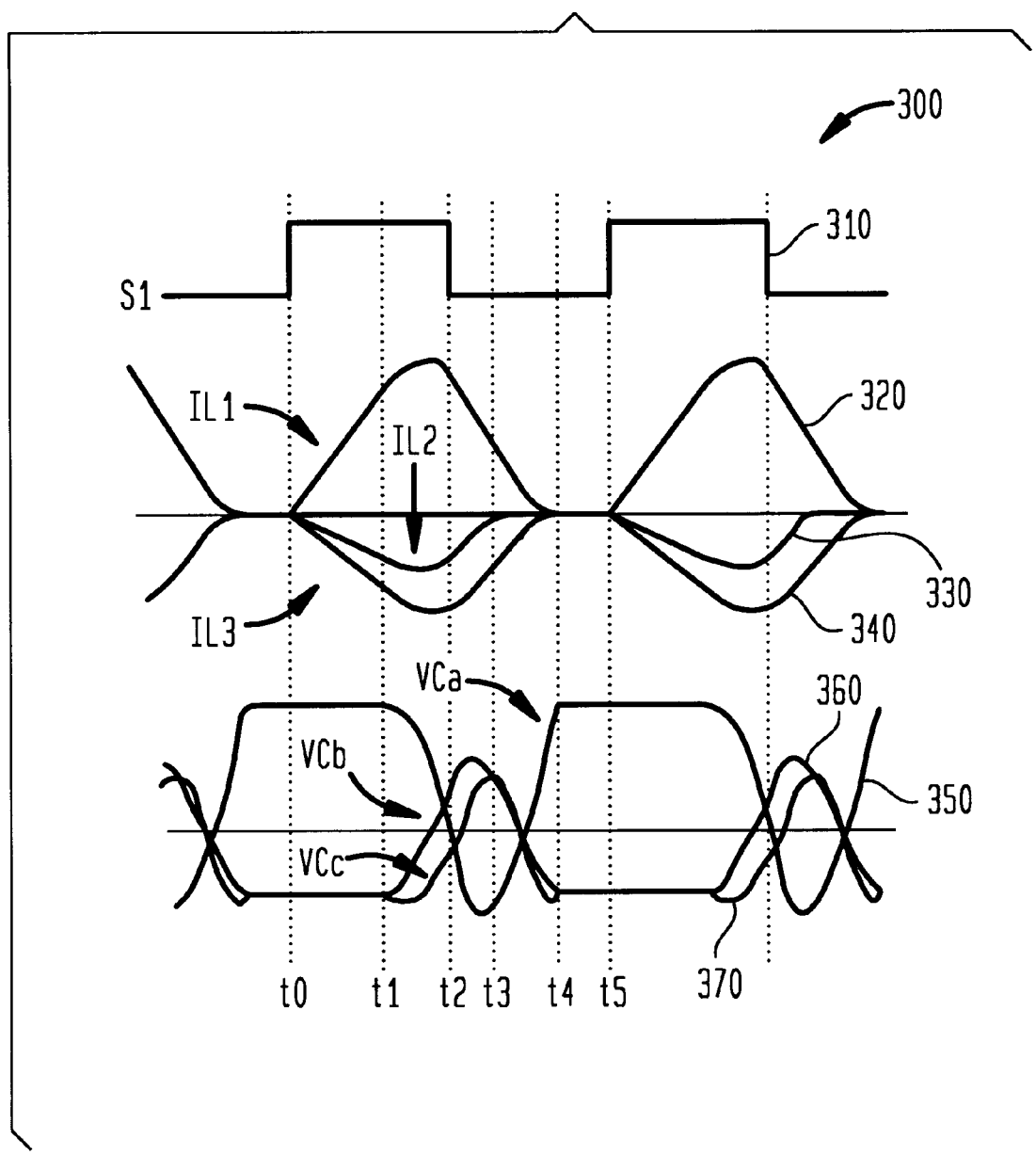
FIG. 3 illustrates exemplary drive signals, current and voltage waveforms for the converter of FIG. 2.

Turning now to FIG. 3, illustrated are exemplary drive signals, current and voltage waveforms 300 of the converter 200 illustrated in FIG. 2. The waveforms 300 include a drive signal 310 of the boost switch S1 and first, second and third current waveforms 320, 330, 340 corresponding to inductor currents in the first, second and third resonant inductors L1, L2, L3, respectively. Also illustrated are first, second and third voltage waveforms 350, 360, 370 corresponding to voltages across the first, second and third resonant capacitors Ca, Cb, Cc, respectively.

The following assumptions and initial conditions apply in describing the operation of the converter 200 in greater detail over an exemplary switching cycle (of course, the assumptions and conditions are not necessary to the operation of the converter 200).

(1) All the capacitors except the output capacitor Co are relatively high frequency capacitors, i.e., the average current through each capacitor over a switching cycle is sufficiently small compared to the high frequency operating current such that its voltage stays in its designed operating region. In other words, the low frequency components of their currents are relatively small.

(2) All the inductors are relatively high frequency inductors, i.e., the average volt-second applied on each boost inductor over a switching cycle is close to zero. In other words, the boost inductors do not carry low frequency voltages.

(3) Phase voltage (Va) and phase current (Ia) coupled to the first boost inductor La are greater than 0, or positive; phase voltages (Vb and Vc) and currents (Ib and Ic) coupled to the second and third boost inductors Lb, Lc are negative.

(4) All phase currents (Ia, Ib and Ic) are in continuous conduction mode (CCM).

(5) The first boost switch S1 is operated with a duty cycle of about 50%.

It should be noted that the following operational modes are for illustrative purposes and that the operational modes may vary with different operating conditions. Also, for the purposes of the following description and referring to FIG. 2, positive inductor current is defined as moving from left to right and capacitor voltage is defined as positive on its top, or upper, terminal.

The exemplary operation of the converter 200 begins, at time t0, when the boost switch S1 is turned ON. Initially, the voltages across the first, second and third resonant capacitors Ca, Cb, Cc, i.e., the first, second and third voltage waveforms 350, 360, 370, respectively, are in the same polarity as their corresponding phase-to-neutral voltages. Hence, with the boost switch S1 ON, the currents in the first, second and third resonant inductors L1, L2, L3 begin to increase in amplitude (see the current waveforms 320, 330, 340). They first increase linearly with no change in capacitor voltages, then in a resonant mode as the currents in the first, second and third resonant inductors L1, L2, L3 catches up with the currents in the first, second and third boost inductors La, Lb, Lc at time t1. At time t2, the resonant inductor currents reach their maximum values.

At time t2, the boost switch S1 is turned OFF. The currents in the first, second and third resonant inductor L1, L2, L3 begin (if not already have begun) to reduce in amplitude to zero at about time t4. Furthermore, at time t4, the amplitude of the voltages of the first, second and third resonant capacitors Ca, Cb, Cc are also at their peak. The currents in the first, second and third resonant inductor L1, L2, L3 remain at zero from time t4 until time t5, when the boost switch S1 is turned ON again, to begin another switching cycle.

The resonant voltages on the first, second and third resonant capacitors Ca, Cb, Cc draw three phase currents through the first, second and third boost inductors La, Lb, Lc. When a resonant capacitor's voltage is lower than its corresponding phase-to-neutral voltage, the current in its corresponding boost inductor rises. When a resonant capacitor's voltage exceeds its corresponding phase-to-neutral voltage, the voltage on its corresponding boost inductor reverses its polarity. Consequently, the corresponding input phase current begins to decrease in amplitude. The equilibrium point, i.e., when the capacitor voltage is equal to corresponding phase-to-neutral voltage, is determined primarily by the duty cycle of the boost switch S1 and is also a function of the input phase voltage, the output voltage Vout and the values of the resonant inductors and capacitors.

It should be noted that, since the resonant capacitors begin to discharge at the same time (about time t1 and t3), the current through the boost switch S1 is the same as the highest amplitude current in the resonant inductors. Therefore, the boost switch S1 conducts only one resonant inductor current at a time, and not the sum of all three resonant inductor currents as is the case with the converter 100 of FIG. 1. As a result, the converter 200 boost switch S1 conducts significantly less currents compared to the converter 100 boost switches S1, S2. The lower current handling requirement for the converter 200 boost switch S1 provides a significant advantage when selecting power switching devices for the boost switch S1.

Figure 4:
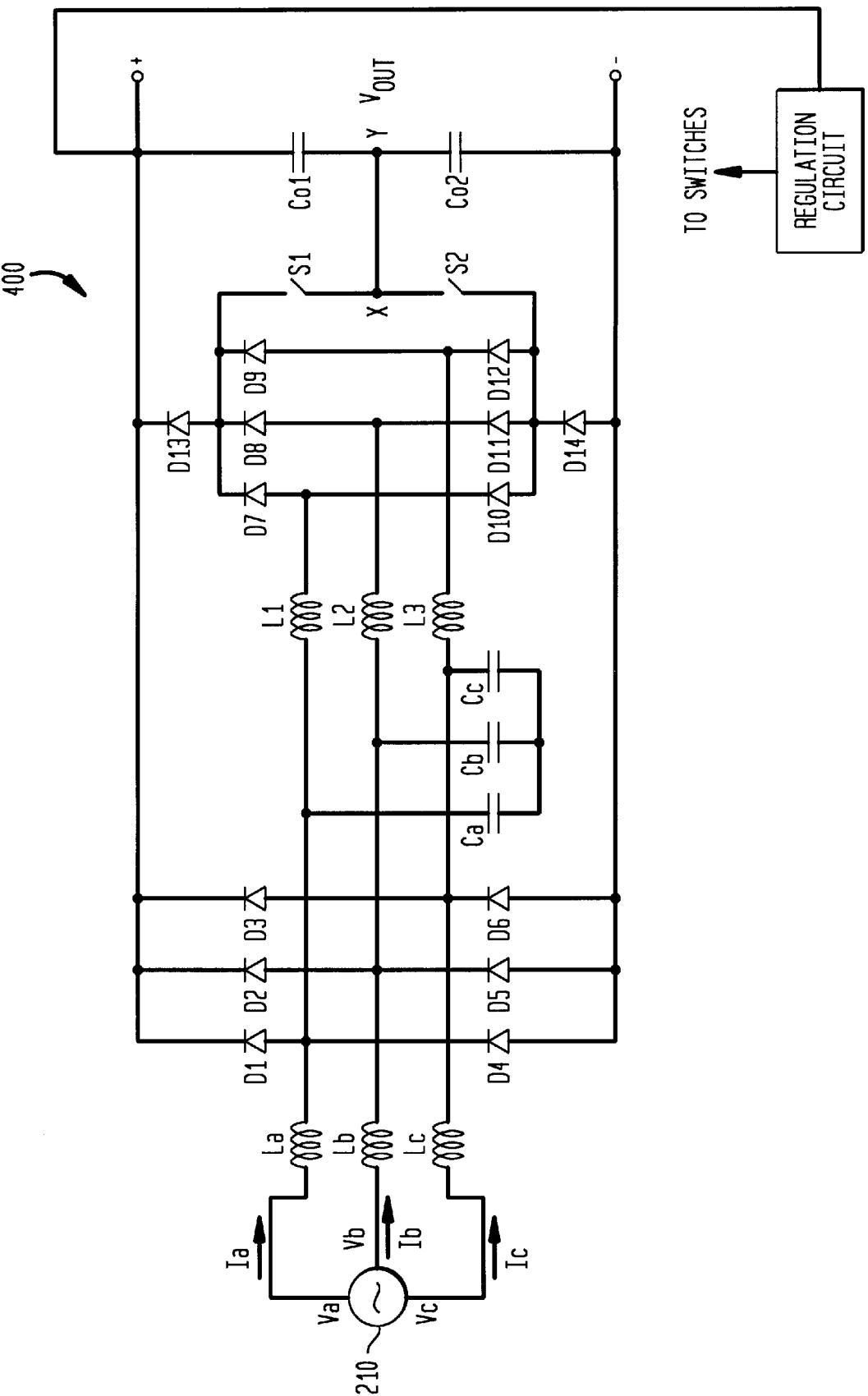
FIG. 4 illustrates a schematic diagram of another embodiment of a three-phase resonant boost converter with two low voltage boost switches.

Turning now to FIG. 4, illustrated is a schematic diagram of another embodiment of a three-phase resonant boost converter 400 with two low voltage boost switches. The converter 400 is similar to the converter 200 of FIG. 2, except that the single boost switch S1 of the converter 200 is replaced with first and second boost switches S1, S2. The first and second boost switches S1, S2 are driven by the same gate drive signal. The operation of the converter 400 is similar to the converter 200 and will therefore not be described in detail. Furthermore, the first and second boost switches S1, S2 are coupled at an intermediate node designated X to another intermediate node designated Y between first and second capacitors Co1, Co2. This arrangement, with about equal voltages on the first and second capacitors Co1, Co2, allows the use of low voltage switches for the first and second boost switches S1, S2. Permitting the use of low voltage switches provides significant advantages in high voltage and high power applications in terms of cost and design.

While specific embodiments of a power converter and a method for reducing a input current THD have been illustrated and described, other embodiments are well within the broad scope of the present invention. For a better understanding of switching power converters, in general, see "Principles of Power Electronics" by John G. Kassakian, et al., Addison Wesley, Inc. (1991), which is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use with a boost converter having first, second and third input inductors, a switching network, comprising:

a first switch coupled between corresponding rails of said boost converter; and first, second and third L-C resonant networks wye-coupled to a common node and coupled to said first, second and third input inductors, respectively, said first switch and said first, second and third L-C resonant networks cooperating to create resonant voltages across, and induce phase currents through, said first, second and third input inductors to reduce input current total harmonic distortion (THD) associated with said boost converter without requiring isolation between said phase currents.

2. The switching network as recited in claim 1 further comprising a second switch coupled to said first switch and first and second intermediate capacitors coupled between said corresponding rails, an intermediate node of said first and second switches coupled to an intermediate node of said first and second intermediate capacitors.

3. The switching network as recited in claim 1 further comprising a rectifier interposed between said first, second and third input inductors and said switching network.

4. The switching network as recited in claim 1 further comprising an output capacitor coupled across an output of said boost converter.

5. The switching network as recited in claim 1 further comprising a plurality of diodes interposed between first, second and third inductors of said first, second and third L-C resonant networks, respectively, and said first switch.

6. The switching network as recited in claim 1 further comprising first and second blocking diodes coupled between said first switch and said corresponding rails.

7. The switching network as recited in claim 1 wherein said boost converter is coupled to a regulation circuit that controls said first switch.

8. For use with a boost converter having first, second and third input inductors, a method of reducing input current total harmonic distortion (THD) associated with said boost converter, comprising:

coupling a first switch between corresponding rails of said boost converter;

coupling first, second and third inductors, respectively, of first, second and third L-C resonant networks to said first, second and third input inductors, respectively;

wye-coupling first, second and third capacitors, respectively, of said first, second and third L-C resonant networks and to a common node; and controlling said first switch to induce said first, second and third L-C resonant networks to create resonant voltages across, and induce phase currents through, said first, second and third input inductors to reduce input current THD associated with said boost converter without requiring isolation between said phase currents.

9. The method as recited in claim 8 further comprising coupling a second switch to said first switch and coupling first and second intermediate capacitors between said corresponding rails, an intermediate node of said first and second switches coupled to an intermediate node of said first and second intermediate capacitors.

10. The method as recited in claim 9 further comprising interposing a rectifier between said first, second and third input inductors and said switching network.

11. The method as recited in claim 9 further comprising filtering an output voltage of said boost converter.

12. The method as recited in claim 9 further comprising interposing a plurality of diodes between said first, second and third inductors and said first switch.

13. The method as recited in claim 9 further comprising coupling first and second blocking diodes between said first switch and said corresponding rails.

14. The method as recited in claim 9 wherein the act of controlling is performed by a regulation circuit.

15. A low input current total harmonic distortion (THD) boost converter, comprising:

first, second and third input inductors; and a switching network, comprising:

a first switch coupled between corresponding rails of said boost converter; and first, second and third L-C resonant networks wye-coupled to a common node and coupled to said first, second and third input inductors, respectively, said first switch and said first, second and third L-C resonant networks cooperating to create resonant voltages across, and induce phase currents through, said first, second and third input inductors to reduce input current total harmonic distortion (THD) associated with said boost converter without requiring isolation between said phase currents.

16. The boost converter as recited in claim 15 wherein said switching network further comprises a second switch coupled to said first switch and first and second intermediate capacitors coupled between said corresponding rails, an intermediate node of said first and second switches coupled to an intermediate node of said first and second intermediate capacitors.

17. The boost converter as recited in claim 15 further comprising a rectifier interposed between said first, second and third input inductors and said switching network.

18. The boost converter as recited in claim 15 further comprising an output capacitor coupled across an output of said boost converter.

19. The boost converter as recited in claim 15 wherein said switching network further comprises a plurality of diodes interposed between first, second and third inductors of said first, second and third L-C resonant networks, respectively, and said first switch.

20. The boost converter as recited in claim 15 wherein said switching network further comprises first and second blocking diodes coupled between said first switch and said corresponding rails.

21. The boost converter as recited in claim 15 further comprising a regulation circuit that controls said first switch.

* * * * *